Figure 1:
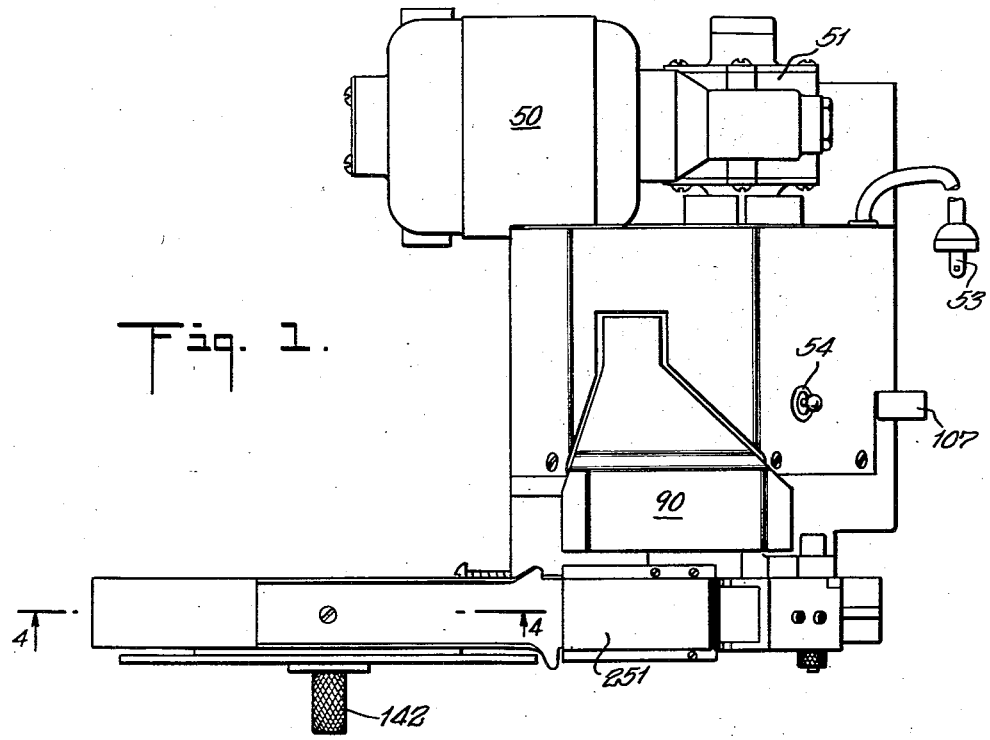

June 4, 1957  R. S. KAFKA  2,794,391
TICKETER
Filed May 1, 1950  12 Sheets-Sheet 1

INVENTOR.
Robert S. Kafka
BY
Dale A. Bauer
ATTORNEY.

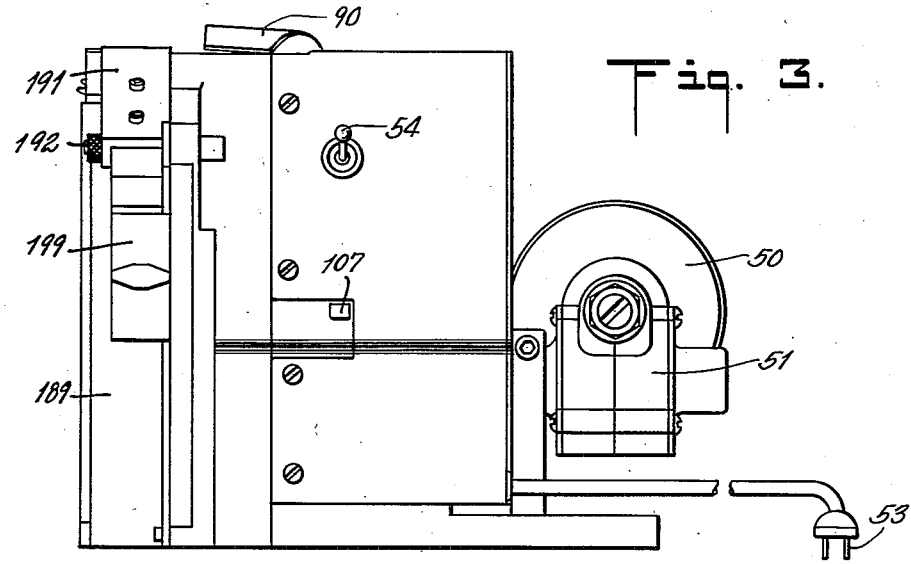
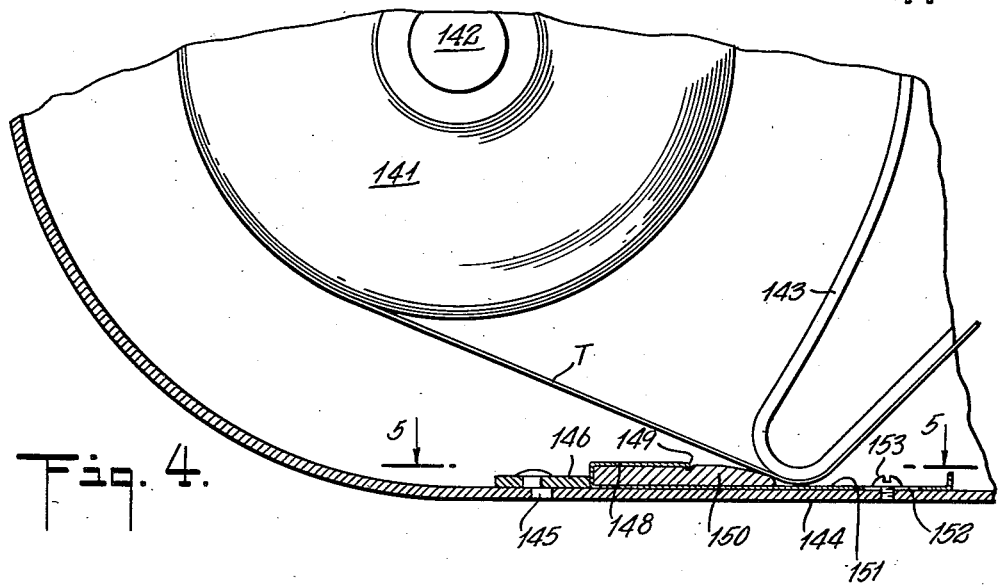
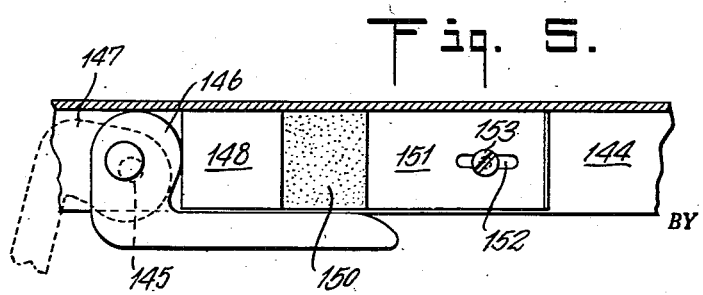

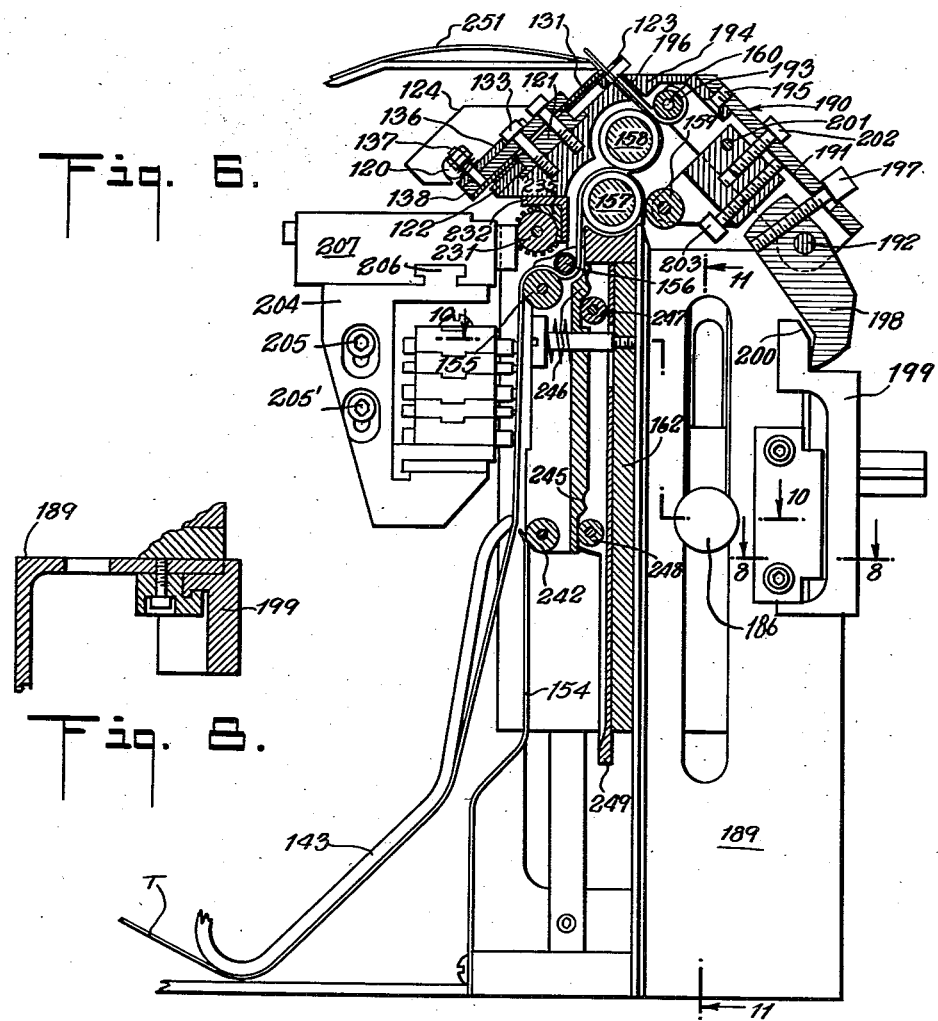

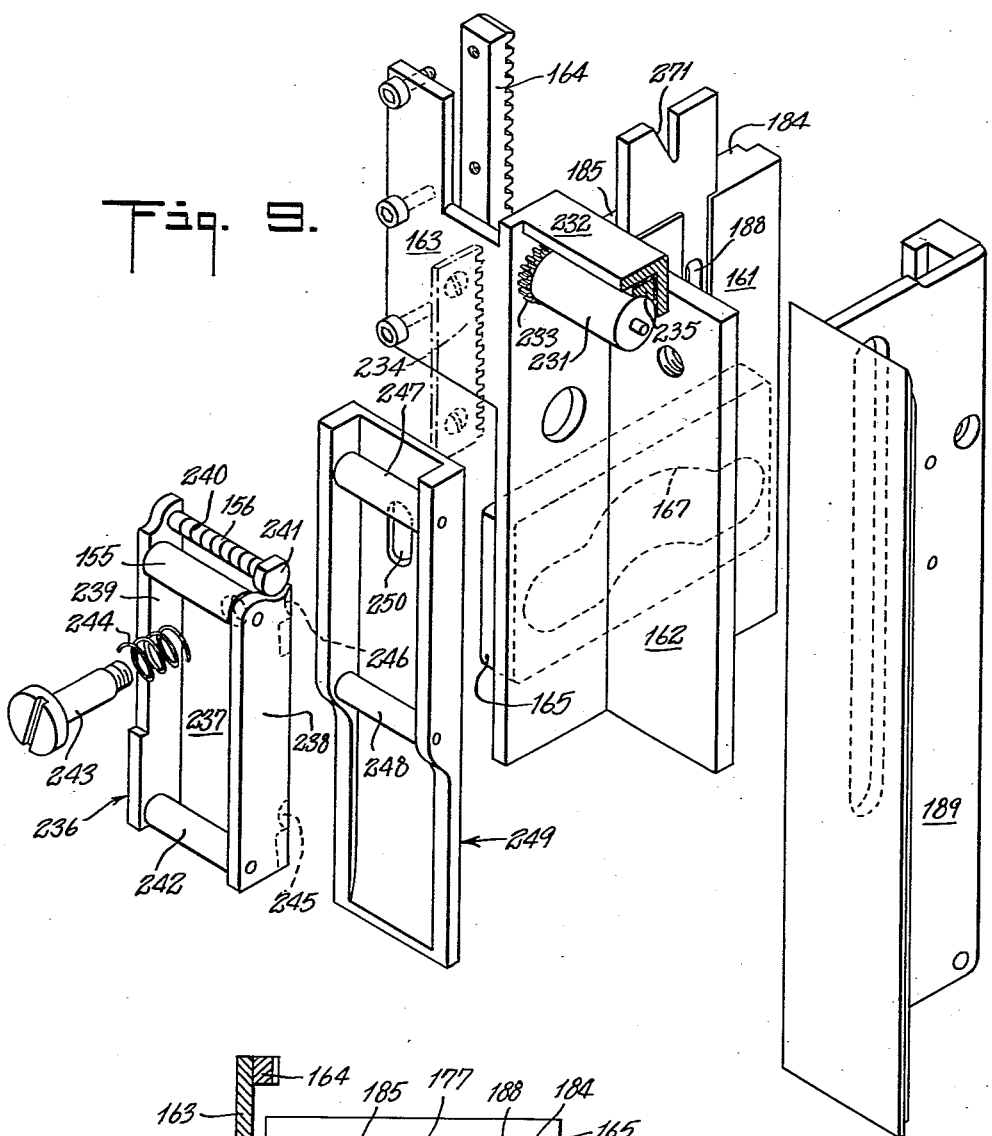
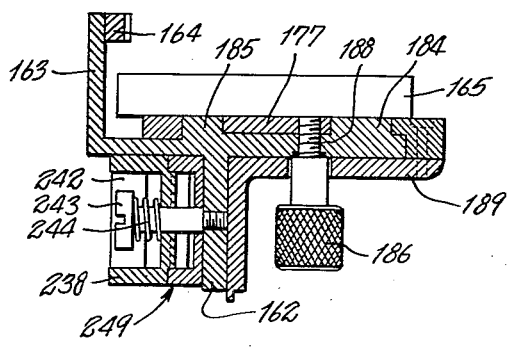

INVENTOR.
Robert S. Kafka
BY
Dale A. Bauer
ATTORNEY

June 4, 1957  R. S. KAFKA  2,794,391
TICKETER
Filed May 1, 1950  12 Sheets-Sheet 6

INVENTOR.
Robert S. Kafka
BY
Dale A. Bauer
ATTORNEY.

INVENTOR.
Robert S. Kafka
BY
Dale A. Bauer
ATTORNEY.

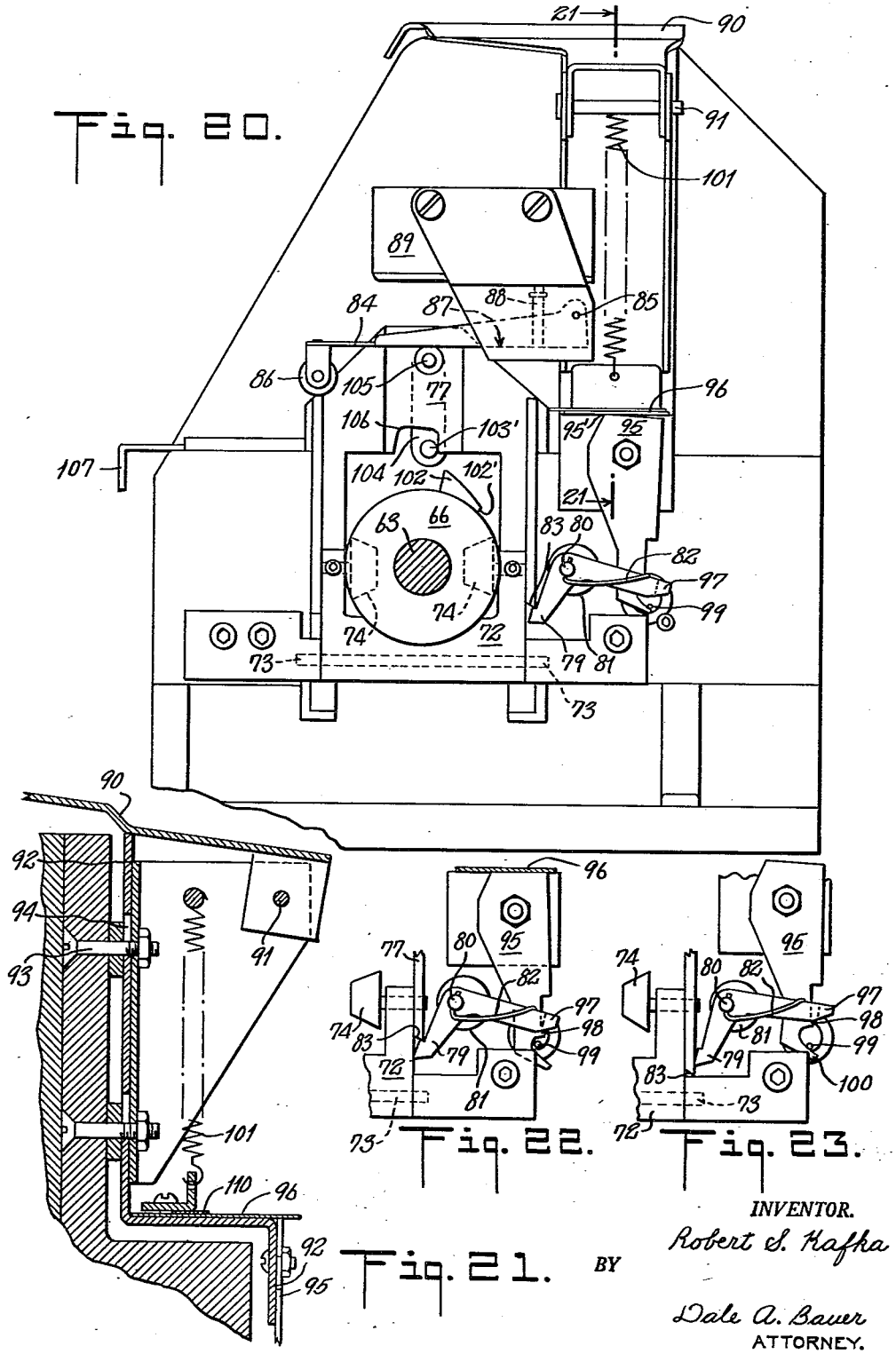

June 4, 1957　　　　　R. S. KAFKA　　　　2,794,391
TICKETER

Filed May 1, 1950　　　　　　　　　　　12 Sheets-Sheet 10

INVENTOR.
Robert S. Kafka
BY
Dale A. Bauer
ATTORNEY.

June 4, 1957  R. S. KAFKA  2,794,391
TICKETER
Filed May 1, 1950  12 Sheets-Sheet 11
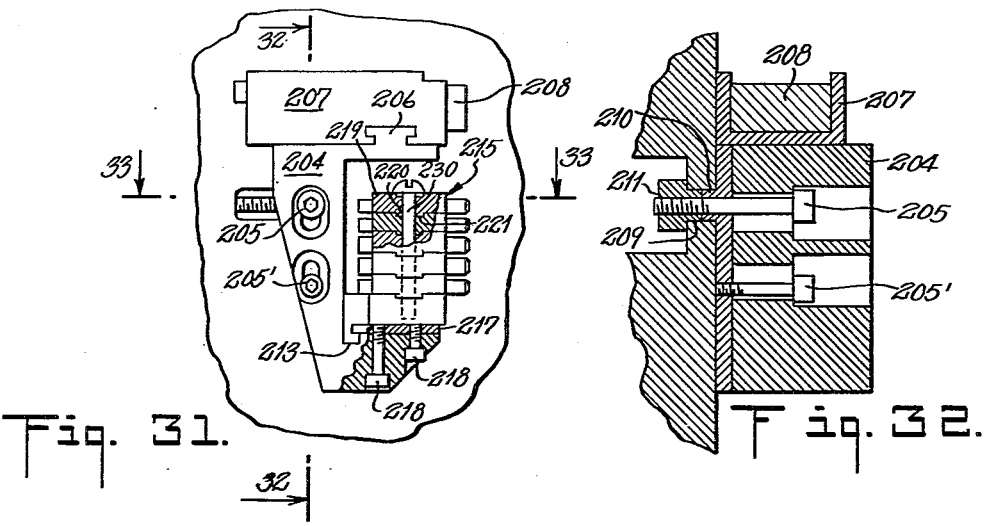
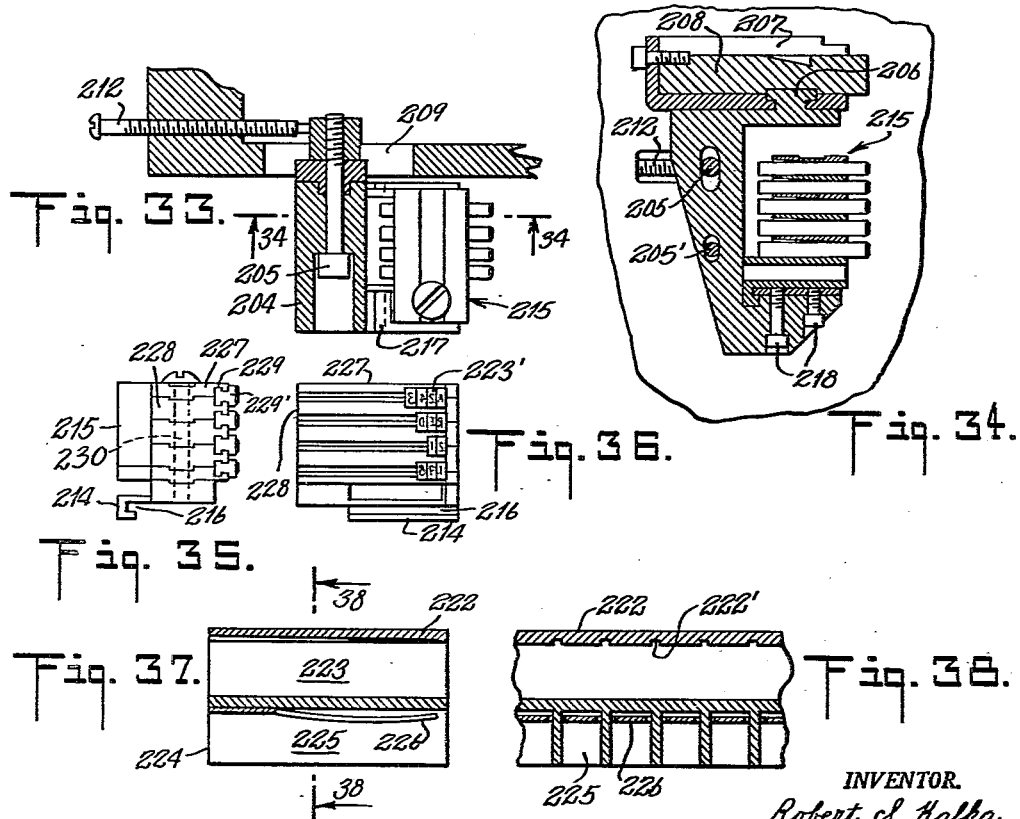
INVENTOR.
Robert S. Kafka
BY
Dale A. Bauer
ATTORNEY.

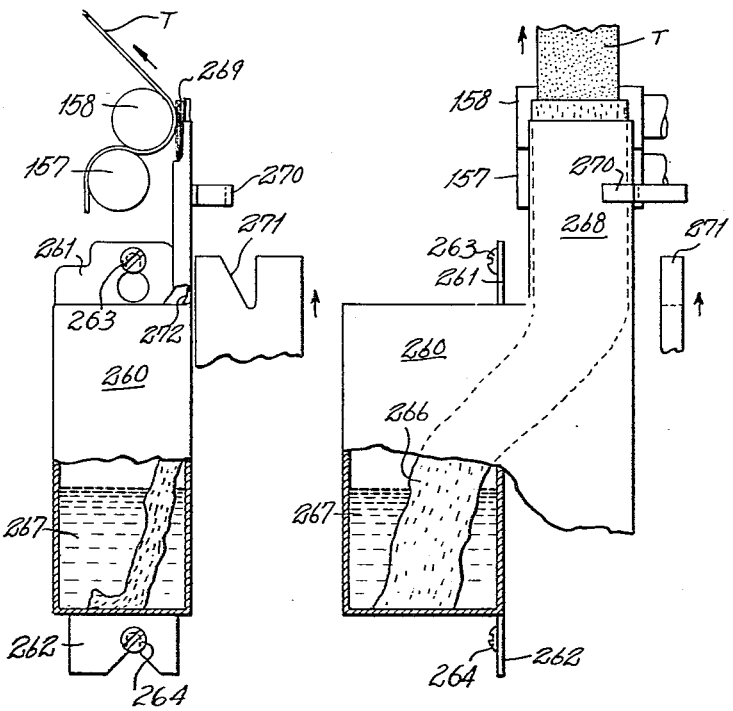

United States Patent Office 2,794,391
Patented June 4, 1957

2,794,391
TICKETER

Robert S. Kafka, Woodside, N. Y., assignor to Midland Equipment Corporation, New York, N. Y., a corporation of New York Application May 1, 1950, Serial No. 159,178

11 Claims. (Cl. 101—260)

This invention relates to a ticketing machine. Certain basic principles applicable to ticketing machines are set forth in my copending application Serial No. 18,507 filed April 2, 1948, now Patent No. 2,656,063. To the extent that this application contains concepts that constitute improvements upon the concepts therein disclosed, this case is a continuation in part, but as to the other several concepts that are first disclosed herein, this case is original.

This apparatus is a ticket making and applying machine. It holds a length of tape, prints the tape, separates the printed tape into tickets and applies the tickets to objects if desired. It controls the passage of the tape through the machine, separates a backing strip from the adhesive coating of tape of that sort, or moistens the glue on tape of another sort, severs the tickets completely or partially from each other, and delivers the tickets to a convenient applicator. It permits tickets of varying size to be produced at will, singly or continuously. It permits the printed matter on the ticket to be changed at once. It employs type for printing and involves new concepts in type chases and in the application of ink to type. It involves new concepts in tape cutters. It coordinates the operations of feeding tape, inking type, printing the tape, separating the backing from the tape, cutting the tape between printed areas to form tickets, and applying the tickets to objects.

The means of applying power to the machine are novel and involve concepts for delivering one ticket at a time by a single revolution of the driving means and for delivering tickets continuously as desired. The concepts extend to the field of electric motors and their control and to the problems of supplying power to the machine from an electric motor.

Within the general concepts are particular concepts some of which will be mentioned here and others of which will be referred to as the description proceeds in detail. Among these concepts are a new knife and cutting means, a new chase for type, new gripping and advancing means for tape, a new drag brake for tape, a new clutch coupling and control, a new interrupter to insure the stopping of the mechanism after each revolution when it is set for single ticket delivery, and a new latch and trigger mechanism for the operation of the machine.

Even these internal concepts contain other concepts but those will be referred to in the detailed description.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 2:
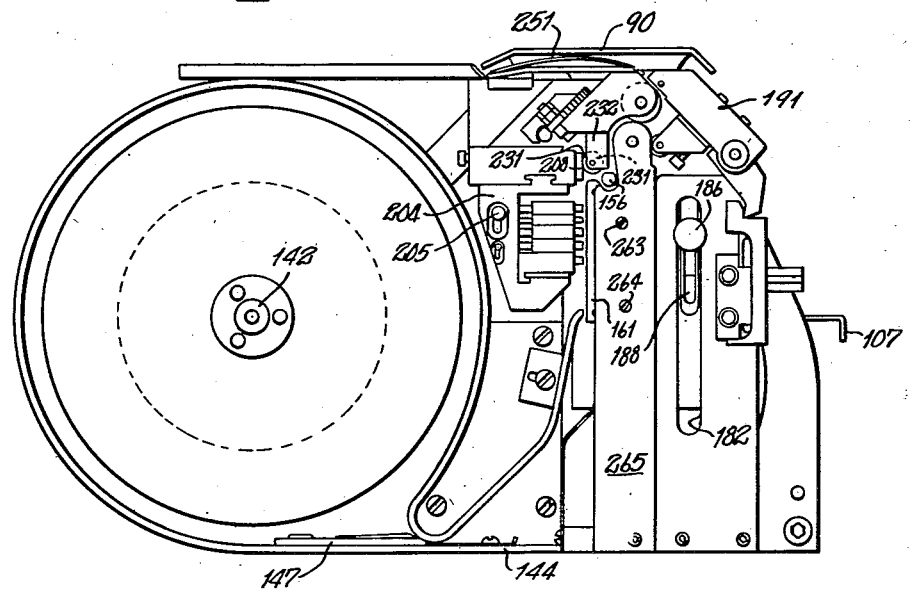
Figure 11:
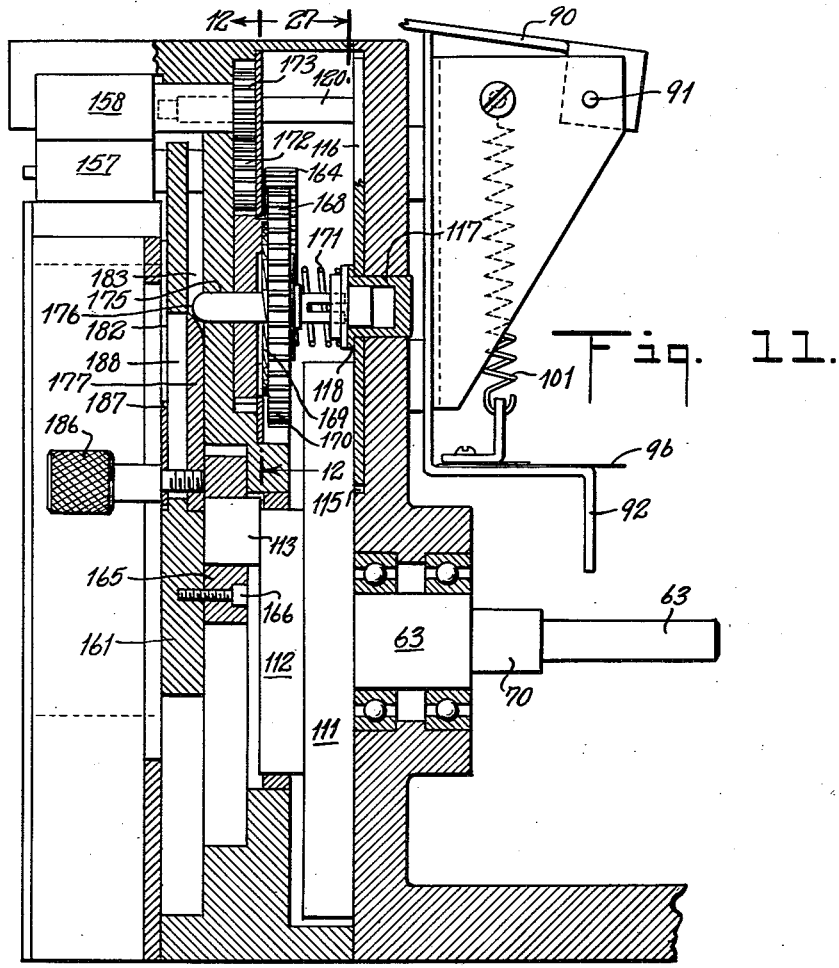
Figure 12:
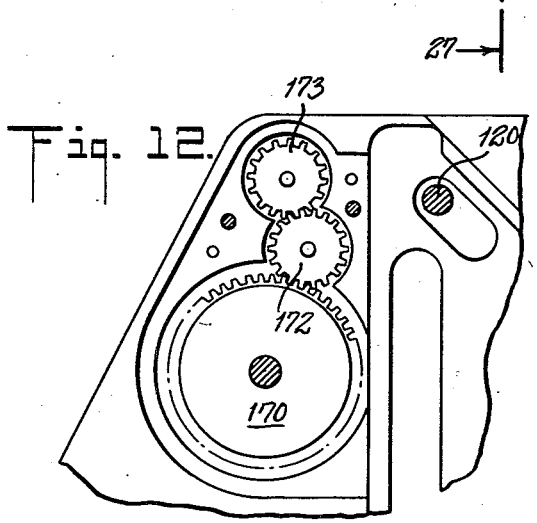
Figure 13:
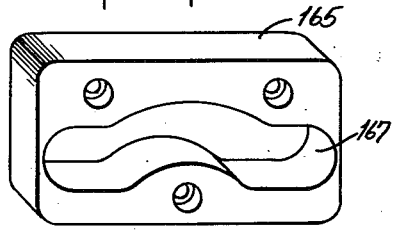
Figure 14:
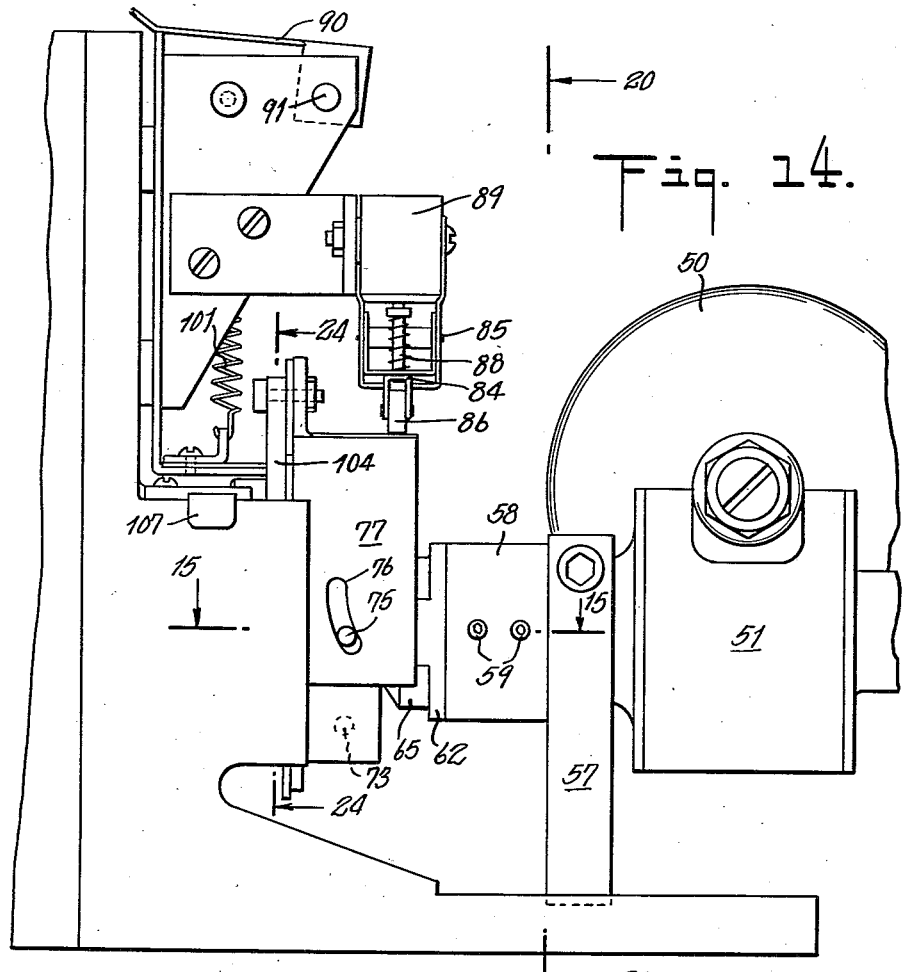
Figures 15, 16:
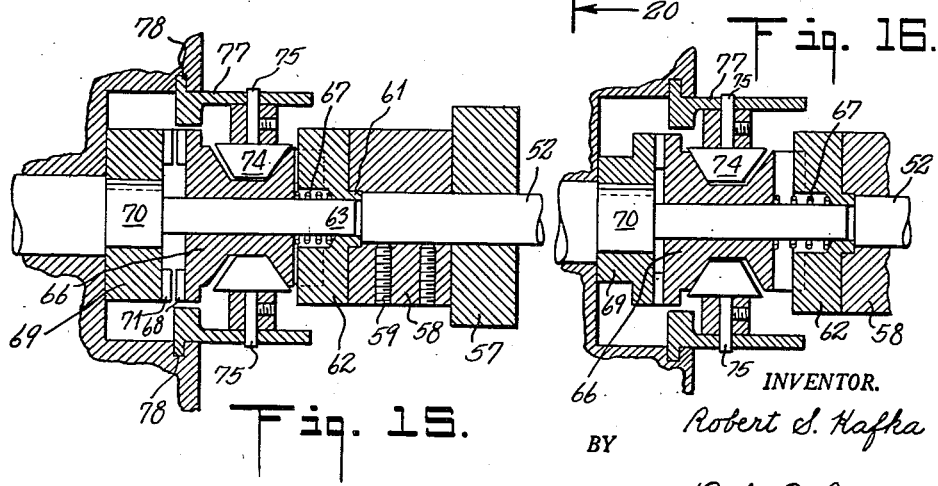
Figure 29:
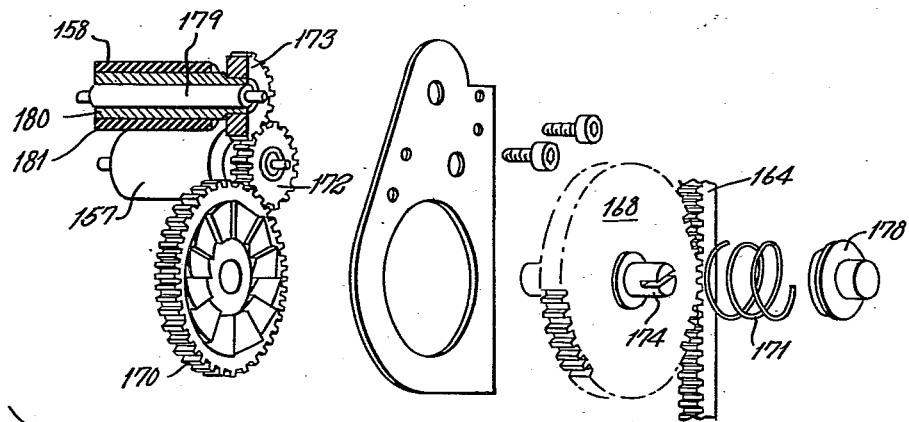
Figure 17:
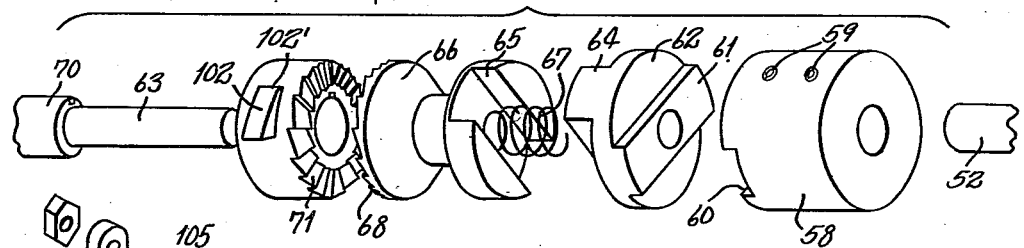
Figure 18:
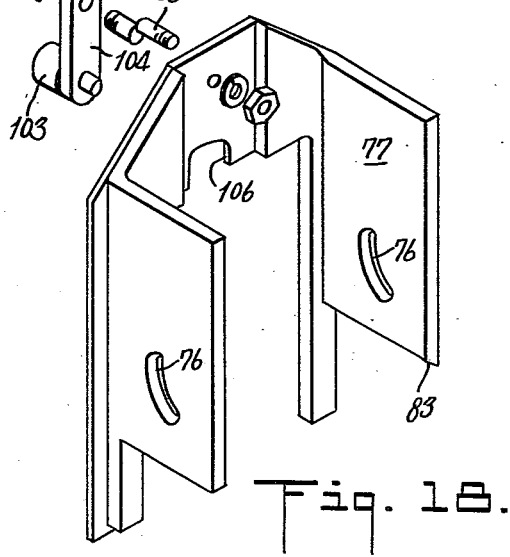
Figure 19:
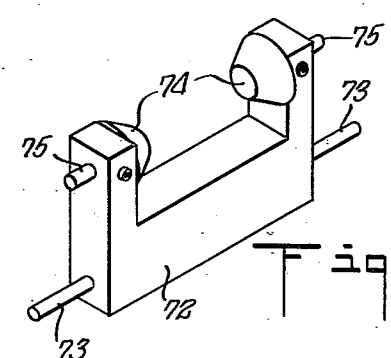
Figure 24:
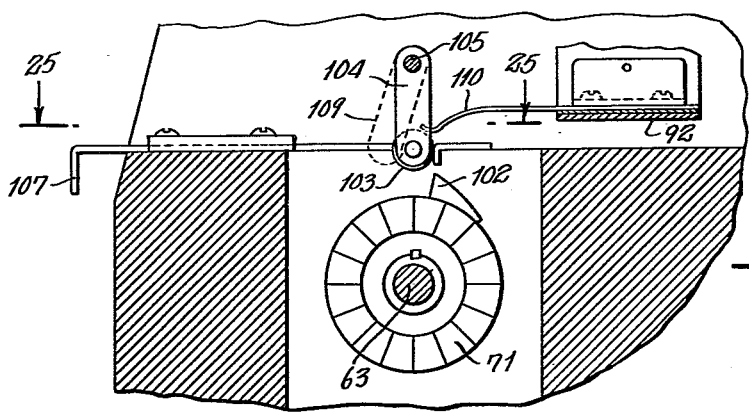
Figure 25:
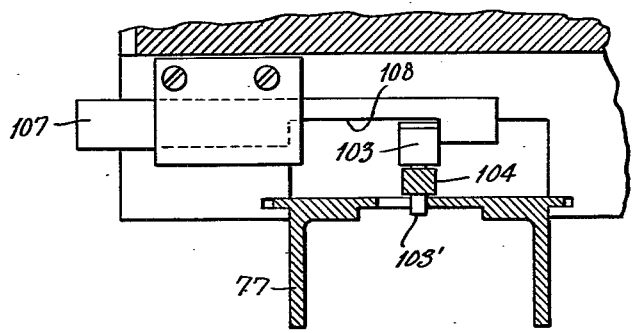
Figure 26:
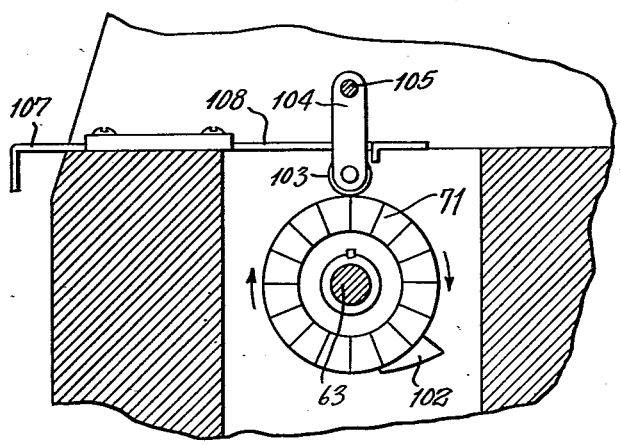
Figure 27:
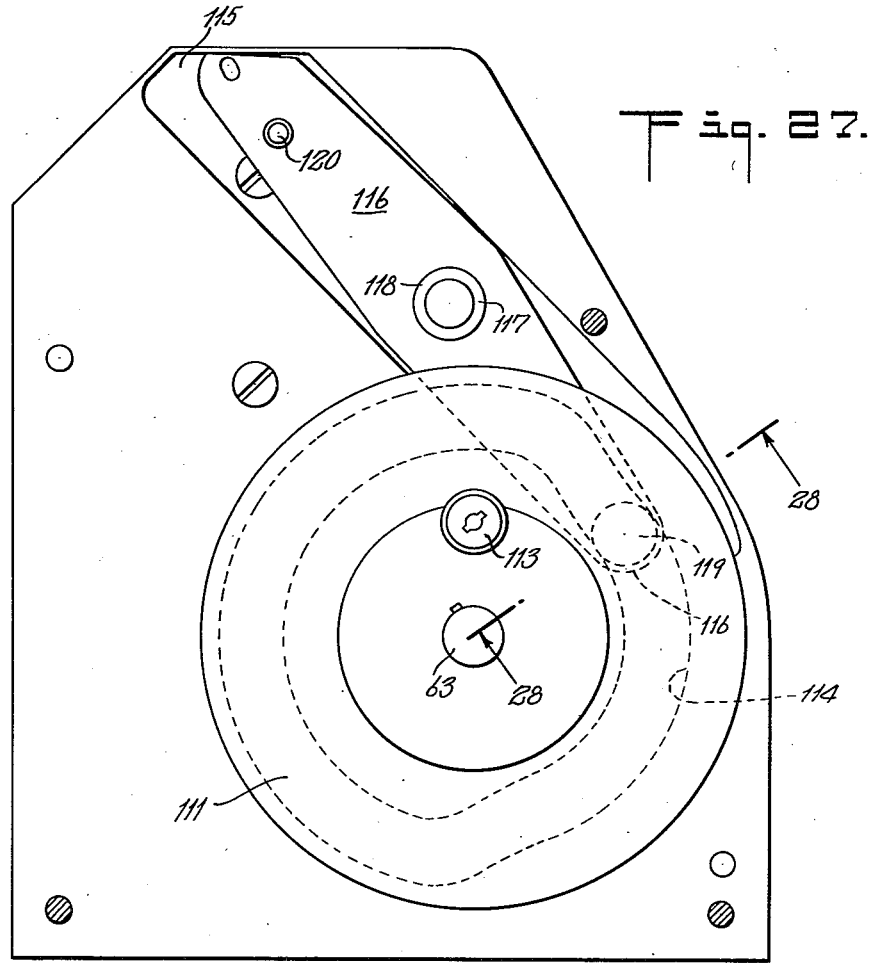
Figures 28, 30:
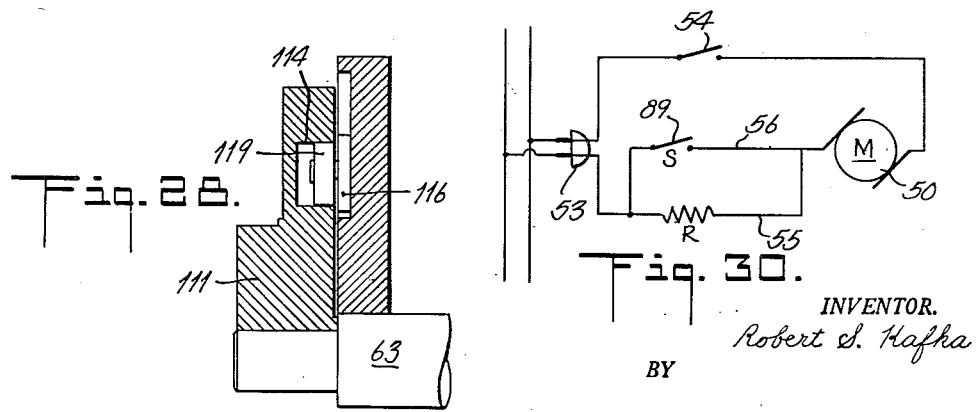

In the drawings, wherein like reference characters refer to like parts throughout the several views, Fig. 1 is a plan view of a preferred embodiment of the invention;
Fig. 2 is a front view of the apparatus shown in Fig. 1;
Fig. 3 is a side view looking from the right of Figs. 1 and 2;
Fig. 4 is an enlarged detail on the line 4—4 of Fig. 1;
Fig. 5 is an enlarged detail on the line 5—5 of Fig. 4;
Fig. 6 is an elevational view from the front, partly in section, showing the printing and tape delivering apparatus;
Fig. 7 is an exploded view in perspective of the parts of the cutter;
Fig. 8 is a detail on the line 8—8 of Fig. 6;
Fig. 9 is an exploded view in perspective of the parts of the printing mechanism and related structure;
Fig. 10 is a section on the broken line 10—10 of Fig. 6;
Fig. 11 is a section on the line 11—11 of Fig. 6;
Fig. 12 is a section on the line 12—12 of Fig. 11;
Fig. 13 is a detail of the modified scotch yoke employed in the drive;
Fig. 14 is a side view of the power end of the apparatus with the cover removed;
Fig. 15 is a section on the line 15—15 of Fig. 14, showing the clutch disengaged;
Fig. 16 is a section similar to Fig. 15 showing the clutch engaged;
Fig. 17 is a dismantled view of the power shafting and clutch, in perspective;
Fig. 18 is a perspective, exploded view of the control slider;
Fig. 19 is a perspective detail of the clutch yoke;
Fig. 20 is a rear view, partly in section, of the control mechanism viewed from line 20—20 of Fig. 14;
Fig. 21 is a section on the line 21—21 of Fig. 20;
Figs. 22 and 23 are details of the latch and trigger mechanism, Fig. 22 being in the inoperative position of the machine and Fig. 23 in the operating position of the machine;
Fig. 24 is a detail on the line 24—24 of Fig. 14;
Fig. 25 is a section on the line 25—25 of Fig. 24;
Fig. 26 is a section similar to that of Fig. 24 showing the cam and follower in a different position;
Fig. 27 is a section on the line 27—27 of Fig. 11;
Fig. 28 is a detail section on the line 28—28 of Fig. 27;
Fig. 29 is an exploded view of the drive from the slide to the tape advancing rollers;
Fig. 30 is a wiring diagram of the motor and operating switch connections;
Fig. 31 is an elevational view, partly broken away, of the printing chase and holder;
Fig. 32 is a section on line 32—32 of Fig. 31;
Fig. 33 is a section on line 33—33 of Fig. 31;
Fig. 34 is a section on line 34—34 of Fig. 33;
Figs. 35 and 36 are end and face views respectively of one form of the chase;
Fig. 37 is a vertical section through a type chase of slotted construction (upper) and spring construction (lower);
Fig. 38 is a section on line 38—38 of Fig. 37;
Fig. 39 is a side view of a moistener for use with gummed tape; and,
Fig. 40 is an end view of the moistener.

A motor 50, which in the machine being described is a universal series motor operating off an electric light circuit, drives through a 60–1 reduction gear 51 to a countershaft 52 shown in Figs. 15 and 16. A plug 53 can be connected to an ordinary outlet and delivers current to a switch 54, shown in Figs. 1 and 30. The motor is continuously energized when switch 54 is on, through a line 55 containing a resistor R. When full power is required of the motor a line 56 is closed around the resistance R by a switch 89 which is coordinated with a clutch in the shafting line so that the clutch is mechanically engaged as the motor receives full current and disengaged when the switch 89 is opened.

Now viewing Figs. 14 to 17, a support 57 carries the housing of the reduction gear 51 and the countershaft 52 which is driven by the reduction gear. A collar 58 is fixed to the countershaft 52 by screws 59 and is provided with a groove 60 on its forward face which receives the land 61 of the sleeve 62 which is rotatably mounted on the end of the main shaft 63. The sleeve 62 has land 64 on its opposite face engaging with the groove 65 in the end of clutch spool 66, which is also rotatable about main shaft 63. A spring 67 thrusts the sleeve 62 toward collar 58 and biases the clutch spool toward the left of the figures. The clutch is a ratchet dog clutch having in addition to the spool, which has ratchet teeth 68 on its face, a collar 69 which is keyed to an enlarged part 70 of the main shaft 63 and has cooperating ratchet teeth 71. When the clutch spool is moved to the left by the spring 67 the land 64 still engages the groove 65 and the teeth 68 engage the teeth 71 so that power is transmitted from countershaft 52 to main shaft 63.

The energizing of the motor is coordinated with the operation of the clutch. In Fig. 19 is shown a clutch yoke 72 having pintles 73 that are mounted in appropriate bearings on the frame of the machine. A pair of idler rollers 74 are inwardly carried by the arms of the yoke 72 and these rollers can be made to bear on one inner face or the other of spool 66 thus tending to move it into or out of engagement with the collar 69 according to the direction of motion of the yoke. Two pins 75, 75 project outwardly from the arms of the yoke and are received in slots 76, in a slider 77 which has flanges 78 received in vertically disposed grooves in the frame of the machine. The slots 76 constitute cams and the pins 75, 75 constitute cam followers. The slider 77 is reciprocated vertically during the operation of the machine and in its upper position is caught and held by a spring latch 79 which is mounted on a pin 80 which is in turn carried by an eccentric pivot 81 which furnishes a precise adjustment. A spring 82 serves both to hold the latch on the pin and to turn the latch toward engagement with the lower undercut edge 83 of one side of slider 77. A lever 84 is pivoted at 85 on the frame of the machine and is provided with a roller 86 which rides on the slider 77, and with a flat portion 87 which engages the member 88 of microswitch 89 (Fig. 30). In the up position of the slider the microswitch is off and the motor idles at low speed through resistor R. When the slider is in low position the switch is closed and fully energizes the motor 50 through line 56.

In order to control the operation of this mechanism a trip lever 90 is provided which is pivoted on the frame at 91 (Figs. 20 and 21) and has an extension 92 slidably mounted on the frame as by means of bolts 93 and slots 94, and carries at its lower end a trigger 95. Above the trigger is a spring 96 of flat metal which projects over the end of trigger 95, which is so cut as to provide a camming action that biases the trigger outward. The latch has a projection 97 directed away from the observer (Figs. 22 and 23) and the trigger has a hook 98 capable of catching under the projection 97 which is controlled by an eccentrically mounted pin 99 which is held in fixed operating position and which guides a prong 100 below the hook 98. When the trip lever 90 is depressed the extension 92 moves downwardly, the spring 96 bears upon the portion 95' (Fig. 20) of trigger 95 and tends to throw the lower end of the trigger toward the right as viewed in Figs. 20, 22 and 23. The more the lever is depressed the more the prong 100 travels to the right, as it is permitted by the pin 99, until finally the hook 98 is caught under the projection 97 and when the trip lever is released a spring 101 raises it to original position and disengages the latch 79 from the slider 77 as shown in Fig. 23. However, as the trigger 95 rises, the pin 99 bears on the prong 100 and moves it leftward into position for another operation.

The slider 77, having been released by the latch, moves downwardly under the impulse of spring 67 acting through the pintles 75 and the cams 76. The rollers 74 move the spool 66 toward the left and the ratchets 68, 71 of the clutch engage, transmitting the driving force of countershaft 52 through collar 58, sleeve 62, spool 66, collar 69 to main shaft 63.

The collar 69 is provided with a truncated cam 102 (Figs. 17, 20, 24 to 26) and the slider 77 has a cam follower, including a roller 103 attached to a link 104, which is pivoted to the upper part of the slider by an eccentric bearing pin 105. By turning the eccentric pin, the vertical position of the roller can be altered. The axle of roller 103 projects beyond the link 104 into an aperture 106 in the slider, the sides of the aperture serving to limit the movement of the cam follower. The right side of the aperture (Fig. 20) is placed below the pin 105 so that the follower cannot swing beyond the vertical position, while the left side of the aperture permits the cam follower a greater degree of movement. When the cam 102 reaches the follower 104 it lifts the slider high enough for the latch 79 to catch the slider. At the same time, the microswitch 89 has been turned off by lever 84 while the slots 76 force the pins 75 to pivot the yoke about pintles 73 and to disengage the clutch spool by the pressure of rollers 74 acting to overcome the pressure of spring 67. The machine is thus stopped after one complete revolution and it requires another application of the trip lever 90 to repeat the operation with this setting of the machine.

It is, however, desirable to turn out a plurality of tickets and means are provided to operate the machine continuously. Reference is had to Figs. 20 and 24 to 26, wherein there is shown a push bar 107 which is mounted on the frame of the machine with a friction fit. This bar has a cut out portion 108 which receives the cam follower roller 103 and engages it on the right side as shown in the figures. By pulling the bar outward the cam follower is pivoted about pin 105 to the position shown in dotted lines 109 and in that position the slide will be raised by the truncated cam 102 but not sufficiently to catch the slider on the latch 79 or to turn off the switch 89. Consequently, in that position of the push bar 107 the machine runs continuously and produces a series of tickets. When the bar 107 is pushed in, the truncated face 102' of the cam engages the roller 103, forces the pin 103' against the right side of the aperture 106 and raises the slider to caught position so that the machine comes to rest and the motor idles. Occasionally, the cam 102 stops beneath the follower 103. The spring 110 is mounted on the extension 92 of trip lever 90 and, when depressed, moves the follower off the cam and prevents failure.

There has been described hereinabove the delivery of power to, and the control of, the main shaft 63, which can best be seen in Fig. 11. Mounted on the end of the shaft is a disc or flywheel 111, on the outside face of which is a circular extension 112 which carries a Torrington pin bearing cam follower 113. On the inside of the disc 111 (Fig. 27) is a cam groove 114. Cam follower 113 acts as a crank in driving modified scotch yoke 165 (Fig. 13). The form of the scotch yoke allows a dwell of 60°. The cam slot 114 gives two movements to cam follower 119 which through lever 116 activates the cutoff blade. These movements are so disposed that during the 60° dwell the cutoff blade is opened by cam slot 114 and remains open during the downstroke of the slide at which time the paper is fed out. When the slide moves upward the cam 114 closes the cutoff blade thus shearing the ticket. The machine draws tape from a roll, prints the tape and cuts the printed tape into tickets. The printing apparatus receives its power from the cam follower 113 and the cutters receive their power from the cam groove 114.

The frame of the machine contains a recess 115 within which a lever 116 is mounted on a fulcrum bearing 117 carried by the frame. This bearing is hollow and supports the lever on its outer surface. Beneath a frame 118 the lever 116 has a cam follower 119 that is seated in the groove 114, which thus, at every revolution, reciprocates the lever about the bearing 117. At the end of the lever opposite the cam follower is a stud 120 which projects into engagement with the cutting mechanism, which is shown in Figs. 6 and 7.

The frame of the machine has a recess which receives the foot of spacer 121. The height of the spacer above the foot is equal to the height of cutter member 122 including the blade 123. An arm 124 projects from the cutter 122 and receives in a slot 125 the end of stud 120. The reciprocation of the stud 120 reciprocates the blade 123 which is the moving member of the tape cutter. A slot 126 in the center of cutter 122 receives the spacer 121 and is guided thereby. The blade 123 has a triangular opening 127 at one end, the edges 128, 129 of which are angularly arranged knives, sharpened on the underside so as to leave a flat upper surface. A cut out portion 130 provides abutments for positioning the blade accurately in the machine. The tape T is brought through the aperture 127 as shown in Fig. 6.

The second element of the cutters is an adjustable fixed blade 131 which is laterally curved as indicated by the radius lines in Fig. 7 and longitudinally curved toward the knife edge, being sharpened on top only so that when it is in position it will be forced flat upon the blade 123. Blade 131 is provided with a central slot 132 which receives the bolts 133 but is not big enough to receive the spacer guide 121. A pin 134 projects from blade 131 and is received in an aperture 135 in adjusting lever 136 which is mounted on and pivots about a pin 137 on plate 138 in which the bolts 133 are seated. The lever 136 has a serrated edge 139 which projects out to a convenient distance for manipulation. This lever is held on the pin 137 by a spring and double nuts as shown in Fig. 6. The general position of the fixed knife assembly can be adjusted by means of the slots 132 and bolts 133. The lie of the knife edge with respect to the angularly arranged edges, and its longitudinal position can be adjusted within limits provided by stops 140 and the heads of screws 133. This particularly provides for longitudinal adjustment of the blade 131 under the plate 138 during operation.

As the blade 123 is moved by the stud 120 toward the knife edge of blade 131 it carries the tape with it and cuts the tape first at its outer extremities and then progressively from each edge toward the center. The position of blade 131 determines whether the cutting of the tape will be complete or whether each ticket will be connected to the following ticket by a small uncut portion at the center; the width of the uncut connection is determined by the setting of the blade 131. Thus, by moving the blade to its lowest limit no cutting will occur; by advancing it toward the knife edges 128, 129 cutting will proceed at the outer end only; by advancing it still further, cutting may be made to extend inward from the edges to any desired extent; and by advancing the blade still further a complete severance of each ticket is assured. The machine proceeds identically in the severance of succeeding tickets in accordance with the setting of the blade 131, and that setting is controlled by pivoting the lever 136 around pin 137.

The mechanism by which the tape is advanced and controlled is important and is shown in Figs. 2, 4, 5, 6, and 29. The tape employed as shown in the drawings is of the type described in my copending application, consisting of paper with an exposed face to be printed and an adhesive coated back which is covered by a readily separable backing strip such as waxed paper or the like, to which the adhesive does not permanently attach itself. In a modification of the invention, tape coated with water sensitive glue can be employed. Inasmuch as the use of the double tape requires a higher degree of control and greater complexity of the machine the description is directed to that form of the invention.

A roller of tape 141 is mounted on an axle 142 and the tape T is drawn off it and passed beneath a metal guide 143 which has a curved approach to the base 144 of that part of the machine. A drag brake is provided to apply a finely adjustable drag to the tape as it passes beneath the guide 143, including an eccentric pivot 145 which can be turned to move a cam 146 of lever 147 toward or away from a drag which is composed of a metal slider 148 which grips between jaws 149 a felt brake 150. The lever engages the side of the brake and is in operating position of the brake when so engaged. The force exerted is determined by the setting of the eccentric pivot 145. The metal member 148 is attached to a strip 151 which is loosely held on the base 144 by slot and screw 152, 153. In the operation of the machine this arrangement makes it possible to secure a fine balance between the pull of the gripping rollers on the tape and the resistance of the brake, thus achieving an ideal tension on the tape by the cooperation of these parts.

The tape proceeds between the end of guide 143 and a leaf spring 154 (Fig. 6) which is attached to the base of the machine and provides at its upper end a narrow space through which the tape may pass. During the printing the leaf spring is pressed against the tape, which is gripped between the end of guide 143 and held against motion.

The tape passes over a printing roller, under a ducking roller 156, and between gripping rollers 157, 158. As it issues from between these rollers the backing is separated from the ticket strip and passes between roller 157 and roller 159, while the ticket strip passes between roller 158 and roller 160 and to the opening 127 in cutter 122. The gripping rollers 157, 158 are moved by mechanism shown in Figs. 9, 11 and 29. Mounted in the frame of the machine for vertical sliding movement is a slide plate 161 which is at right angles to the main shaft. Projecting outwardly from the plate 161 is a flange 162, and in the opposite direction a flange 163 to which is affixed a rack bar 164. On the side of the slide toward the main shaft is carried a modified scotch yoke 165, which is not only attached by screws 166 but is keyed into the slide. The cam follower 113 is received in the slot 167 of the scotch yoke, which has a vertical arcuate displacement centrally located, which serves to give pause to the movement of the slide at a particular time in the stroke. The slide is, therefore, vertically reciprocated by the rotation of the main shaft, and the rack 164, on the slide, is in engagement with the ratchet gear 168 whose teeth 169 make driving engagement with the ratchet teeth of gear 170 on the down stroke of rack 164 but escape therefrom against the pressure of spring 171 when the rack moves upward, thus imparting intermittent motion to the gear 170 which is in mesh with a gear 172 on roller 157, which is in turn engaged with gear 173 on roller 158. The gear 168 is mounted on an axle 174 which is received in a bearing 175 at one end in the main frame and projects therethrough, having a rounded end 176 in the path of a cam 177 (Fig. 11) which is mounted on the slide 161 and is capable of disengaging the ratchet 169 during a portion of the stroke of the slide. The opposite end of axle 174 is split and received within a bearing 178, which is of sufficient depth to permit the axle to move endwise within it and has an external seat for the spring 171. The gripping rollers (Fig. 29) are made of a steel axle 179, a brass core 180 which turns upon the axle and a rubber cover 181; a steel gear 173 is affixed to one end of the brass core. A groove 182 of shallow depth is cut in the face of plate 161 (Figs. 2, 9 and 11) and a wider groove 183 is provided between abutments 184, 185 (Fig. 9) on the opposite face of the plate. A screw 186, provided with a knurled knob extends through a plate 187 and into the cam 177 so that by releasing the screw the cam and plate can be moved lengthwise of the slot 188 which extends through the slide 161. In this way the position of the cam can be changed by raising or lowering it and it can be fixed in the chosen position.

The machine stops with the slide in raised position. As shown in Fig. 11, the cam 177 is not engaged with the end 176 of the axle of ratchet gear 168 so that that gear, the gear 170 and rollers 157, 158 will be driven through the whole working stroke of the rack 164. However, if the cam 177 is raised so that the gear 168 is disengaged from gear 170 the rollers 157, 158 will be driven only after the cam 177 has moved below the end of the axle and permitted the engagement of the two ratchets. The ticket delivered during the second of these conditions will be shorter than that delivered during the first, and the length of the ticket delivered is variable in proportion to the part of the stroke that is made idle by the cam 177. An element 189 of the frame of the machine engages one face of flange 162, one face of slide 161 and embraces the end of slide 161.

The control of the tape during movement and printing is very important, particularly when double thickness tape is employed and this is secured by a master guide 190 (Fig. 6) which includes a channel shaped member 191 pivoted on the frame of the machine by pin 192 and carrying at its upper end a roller 160 which has a knurled surface divided by a plurality of circumferential grooves 193. The knurled surfaces hold the tape against roller 158 without removing the adhesive. A nose piece 194 is held by screw 195 in the channel 191 and has fine, blade-like members 196 which guide the tape to the cutter without removing the adhesive. The pressure which is applied by rollers 158 and 160 to the tape is adjustable by means of a screw 197 which passes through the channel 191 and into a block 198 above pivot pin 192 which also passes through the block. A locking slide 199 having a cam face 200 engages the end of block 198 and forces it outward and locks it in position. As the force applied by the cam 200 to the roller 160 depends upon the adjustment of screw 197, it is also important that the backing tape T2 which has been separated from the ticket tape T1, as it issues from rollers 157, 158, be drawn with the same force, and a roller 159 is provided, mounted on a pivot 201 in the channel 191, that is given adjustable pressure on that strip by opposed locking screws 202, 203.

In stores it is frequently necessary to label large numbers of articles, and that has heretofore been done in laborious and time-consuming ways, each label or tag being separately inscribed and then affixed by multiple motions to the articles. Difficulty has been experienced in labeling different kinds of articles with different insignia and the apparatus heretofore provided has not been adapted to rapid change in application to different objects. This invention prints the tickets as they are applied and when one group of articles has been labeled the machine is still kept in operation by the simple substitution of one printing chase for another.

A chase holder 204 is attached by means of screws 205 to the frame F of the machine (Figs. 2, 31 and 32). It is roughly C-shaped as viewed from the front and has on top a T-shaped land 206 which receives an ink reservoir 207 which has a cooperating T-shaped slot. The reservoir contains a block of ink absorbent material 208, one end of which projects into alignment with the plane of the type. Adjustability is given the holder by means of a horizontal slot 209 in the frame. The holder has a boss 210 that enters the slot, and prevents vertical motion. The bolt 205 passes through the boss and a nut 211 engages the back of the frame. The head of bolt 205 is countersunk. The lower bolt 205' and the holder can be moved along this slot by means of an adjusting screw 212 (Fig. 33). The lower portion of the holder is provided with a groove 213 to receive a land 214 on the type chase 215 which is undercut at 216. A metal plate 217 attached to the holder by screws 218 holds the plate 217 in engagement with the holder and in the slot provided by the undercut 216.

The chase is of novel construction, being composed of plates 219 which have cooperating lands 220 and grooves 221. Each plate of the chase is constructed to cooperate with the adjacent plate for the reception of type. Thus, in Figs. 37, 38, the plate 222 is cut away at 223 and provided with grooves 222' for the reception of type 223' having tongues to fit the grooves. The grooves are bevelled so that the type can only pass to a selected distance into the holder, the type being provided with tongues to fit the grooves as to width but as to height only at the front of the grooves. The plate 224 has compartments 225 for the reception of type, each compartment having a leaf spring 226 which serves to grip the type so that the filled chase can be handled freely without danger of the type falling out. The plates 227, 228 have cooperating ledges and flanges forming an undercut groove 229 between which are received type 229' of cooperating construction. Long type is suitable for the other forms of the invention. A single screw 230 holds the plates of the chase together (Figs. 31 and 35). When the chase is placed in the chase holder the type (Fig. 31) is in line with the inker 208 and the ink roller 231 (Fig. 2) which transfers the ink from the ink reservoir to the type on the downward motion of the slide 161. The inking roller is carried on the slide by a bracket 232 which is integral with the slide. A gear 233 meshes with a rack 234 (Fig. 9) mounted on the frame of the machine. The bracket 232 holds a swab 235 (Figs. 6 and 9) which spreads the ink evenly over the surface of the roller as the roller is turned by the passage of gear 233 over the rack.

Printing is accomplished by pressing the tape T against the face of the type during the inactive period of rollers 157, 158, that is, during the recovery stroke of rack 164 when the ratchet gears 168, 170 are disengaged. The printing roller 155 (Fig. 9) is carried on a channel shaped frame 236 having a back plate 237 and side frames 238, 239. The ducking roller 156 consists of a metal sleeve having sharp circumferential ridges 240; the sleeve is hollow and a headed bearing pin 241 passes through it and is fixed in flange 239. The head of the bearing pin is flattened at one side to accommodate the adjacent parts of the machine and is slightly spaced from flange 238 so that the tape may be readily threaded under it. The construction of the sleeve 156 is important as the fresh ink is not smeared by it whereas other types of rollers results in smearing. The roller 155 projects beyond the forward edges of flanges 238, 239. At the lower ends of those flanges is carried a roller 242 which serves to press the spring 154 into locking engagement with the tape and guide 143 on the up stroke of the printing frame. The printing frame is mounted on the flange 162 by a pin 243 and spring 244, the pin being screw threaded into the flange 162 and the frame thus being unable to move along flange 162 but being displaceable away from that flange against the compression of spring 244. On the back of frame 236 (Fig. 6) are cams 245, 246, and received in recesses beneath these cams are rollers 247, 248, mounted in a frame 249 which has a slot 250 through which the pin 243 passes. The frame 249 is movable vertically the length of the slot 250 and is itself so long that it engages the frame of the machine at the bottom on the down stroke and at the top on the up stroke. When the bottom of frame 249 hits the machine frame it stops but the printing frame 236 continues downward and outward toward the chase on the cams 245, 246, moving the roller 242 against the spring 154 and the roller 155 against the tape and the type at the bottom of the chase. On the up stroke the roller passes progressively over the tape and presses it into printing contact with the type in the chase. When the frame 249 engages the frame of the machine at the top it is moved downwardly off the cams 245, 246, and the printed portion of the tape passes around roller 155 under ducking roller 156 and through feeding rollers 157, 158 which are put in motion by the engagement of ratchet 168, 170.

As the tape is severed by the cutters, the ticket lies upon a spring 251 which is close beside the trip lever 90, with adhesive side up. The operator takes an article, places it firmly upon the ticket and the lever 90, and presses, simultaneously applying the ticket to the article and depressing the trip lever 90 and its extension 92. As the article is lifted from the lever the machine is placed in motion and another ticket is printed and ejected ready for instant appliance by a single motion.

The machine may be used with gummed tape by the simple addition of the moistener shown in Figs. 39 and 40 which includes a metal reservoir 260 having upwardly and downwardly directed flanges 261, 262 with slot constructed to engage with the heads of the screws 263, 264 which hold the cover 265 over the slide 161 (Fig. 2). A wick 266, dipping in water 267 extends upward into a neck 268 and into engagement with a brush 269 which is supported by the neck in normal moistening relation to the gum on the tape. The neck 268 has an arm 270 spaced at its end from the neck and aligned with a cam 271 in the upper part of the slide 161. As the slider moves upward in its stroke the cam 271 engages the arm 270 and flexes the neck 268, which is composed of spring metal, and is cut away at 272 except for a single thickness. Thus, the moistener is moved into and out of engagement with the tape at the proper time.

It is believed that the machine is novel, that the sub-combinations are novel, and that the parts of the machine are individually novel.

The machine is useful not only in stores but in theaters and in parimutuels, and indeed, wherever it is important to issue tickets of different import at different times. The length of the ticket can be changed to conform to the quantity of matter printed on it and to the size of the article labelled. Ungummed tickets can be issued. When unbacked tape is used the roller 159 is merely idle. If it is desired to issue tickets continuously it can be done by manipulation of push bar 107. The tickets may be completely severed, or partly severed to any desired extent.

This invention involves new and useful methods of printing which can be understood if it be recalled that in ordinary printing processes the printed surface is not touched until the ink is dry and that it smears badly if touched earlier. In this case, where tickets are applied very quickly after printing and where they pass over rollers face down shortly after printing the normal processes are unsatisfactory, and smearing will result. A quick drying ink is preferably employed and ball point ink or stamp pad ink are examples of useful inks, but they alone do not solve this problem. I have discovered that the chase must be moved toward the roller, by adjusting the chase holder, so that the impression of the type is embossed in the paper by the printing roller. This embossing need not be deep but is accomplished by the aid of a compressible printing roller, and is adequate if carried out to a depth on the order of a few ten thousandths of an inch. In one reduction to practice a persisting depth of embossing of two to three ten thousandths was sufficient. The swabbing of the roller and the application of the ink by the swab roller also contribute to the success of this process.

The thin parallel guides of part 190 extend right up to the path of the movable cutter, which can act not only as a cutter but as a means to free the ticket from the guides.

As many apparently widely different embodiments of the present invention may be made without departing from the spirit and scope thereon, it is to be understood that the invention is not limited to the specific embodiments.

What is claimed is:

1. In a ticketer, a chase of type, spaced rear and forward guide means beyond the respective ends of the type for extending a tape into a run overlying and generally parallel to the face of the type, intermittently operated means for feeding forward predetermined lengths of the tape past the type, a slide reciprocable in a plane generally parallel to the face of the type in the direction of the length of said run of the tape, a printing roller confronting the type mounted on the slide, the tape passing between the type and the printing roller partially around the printing roller and thence to the forward guide means, means to reciprocate the slide to carry the printing roller from at least one end of the type to the other, and means to retract the printing roller from the type on the rearward stroke of the slide and to advance the printing roller toward the type to thrust the tape into forcible contact with the type on the forward stroke of the slide.

2. A ticketer as set forth in claim 1, in which the slide comprises a main driven slide body, a sub-slide carrying the printing roller mounted on the main slide body and reciprocable therewith, the sub-slide further being reciprocable generally normal to the main slide body to advance and retract the sub-slide, and means responsive to travel of the main slide body to advance and retract the sub-slide.

3. A ticketer as set forth in claim 2, in which an intermediate slide is interposed between the main slide body and the sub-slide, the intermediate slide being reciprocable with the main slide body but shiftable in forward and rearward directions with respect thereto, cooperating cam and cam follower means on the sub-slide and intermediate slide selectively to advance and retract the sub-slide upon said movement of the intermediate slide relative to the main slide body, and stop means cooperating with the intermediate slide to shift it on the main slide body.

4. In a ticketer, a relatively fixed chase of type, spaced rear and forward guide means beyond the respective ends of the type for extending a tape into a run overlying and generally parallel to the face of the type, intermittently operated means for feeding forward predetermined lengths of the tape past the type, a slide reciprocable in a plane parallel to the face of the type in the direction of the length of said run of the tape, a tape guiding and printing roller mounted on the slide confronting the type, tape guiding and deflecting means parallel to the printing roller, and further from the type than the printing roller, mounted on the slide, the tape passing between the type and the printing roller, in a sinuous path between the printing roller and the tape deflecting means, and thence to the forward guide means, means to reciprocate the slide to carry the printing roller from at least one end of the type to the other, and means to retract the printing roller from the type on the rearward stroke of the slide and to advance the printing roller toward the type to thrust the tape into forcible contact with the type on the forward stroke of the slide.

5. In a ticketer, a relatively fixed chase of type, spaced rear and forward guide means beyond the respective ends of the type for extending a tape into a generally straight run therebetween said run having a zone overlying and generally parallel to the face of the type, a slide reciprocable forwardly and rearwardly in a plane parallel to the face of the type in the direction of the length of said run of the tape, intermittently operated means for pulling forward a predetermined length of the tape past the type during each rearward stroke of the slide, a tape guiding and printing roller mounted on the slide confronting the type, a tape ducking roller mounted on the slide parallel to the printing roller and further from the type than the printing roller, the tape extending from the rear guide means between the type and the printing roller, in a sinuous path over the printing roller and under the ducking roller, and thence to the forward guide means, means to reciprocate the slide to carry the printing roller from at least one end of the type to the other, and means to retract the printing roll from the type on the rearward stroke of the slide and to advance the printing roller toward the type to thrust the tape into forcible contact with the type on the forward stroke of the slide.

6. In a ticketer, a relatively fixed chase of type, spaced rear and forward guide means beyond the respective ends of the type for extending a tape into a run overlying and generally parallel to the face of the type, intermittently operated means for feeding forward predetermined lengths of the tape past the type, a slide reciprocable in a plane parallel to the face of the type in the direction of the length of said run of the tape, a tape guiding and printing roller mounted on the slide confronting the type, tape guiding and deflecting means parallel to the printing roller, and further from the type than the printing roller, mounted on the slide, the tape passing between the type and the printing roller, in a sinuous path between the printing roller and the tape deflecting means, and thence to the forward guide means, the forward and rear guiding means and the printing roller and tape guiding and deflecting means being so constructed and arranged that a first portion of said run of the tape rearwardly of the printing roller lies in a first plane close to the face of the type, and a second portion of said run of the tape forwardly of the tape guiding and deflecting means lies in a second plane generally parallel to and appreciably spaced from the first plane, means to reciprocate the slide to carry the printing roller from at least one end of the type to the other, and means to retract the printing roller from the type on the rearward stroke of the slide and to advance the printing roller toward the type to thrust the tape into forcible contact with the type on the forward stroke of the slide.

7. In a ticketer, a relatively fixed chase of type, spaced rear and forward guide means beyond the respective ends of the type for extending a tape into a run overlying and generally parallel to the face of the type, a slide reciprocable forwardly and rearwardly in a plane parallel to the face of the type in the direction of the length of said run of the tape, intermittently operated means for feeding forward a predetermined length of the tape during each rearward stroke of the slide, a printing roller confronting the type mounted on the slide, the tape passing between the type and the printing roller, partially around the printing roller, and thence to the forward guide means, inking means mounted on the slide forwardly of the printing roller to apply ink to the face of the type prior to the printing portion of each cycle of the ticketer, means to reciprocate the slide to carry the inking means and the printing roller from at least one end of the type to the other, and means to retract the printing roller from the type on the rearward stroke of the slide and to advance the printing roller toward the type to thrust the tape into forcible contact with the type on the forward stroke of the slide.

8. In a ticketer, a relatively fixed chase of type, spaced rear and forward guide means beyond the respective ends of the type for extending a tape into a run overlying and generally parallel to the face of the type, a slide reciprocable forwardly and rearwardly in a plane parallel to the face of the type in the direction of the length of said run of the tape, intermittently operated means for feeding forward a predetermined length of the tape during each rearward stroke of the slide, a printing roller confronting the type mounted on the slide, the tape passing between the type and the printing roller, partially around the printing roller, and thence to the forward guide means, the forward and rear guiding means and the printing roller and tape guiding and deflecting means being so constructed and arranged that a first portion of said run of the tape rearwardly of the printing roller lies in a first plane close to the face of the type, and a second portion of said run of the tape forwardly of the tape guiding and deflecting means lies in a second plane generally parallel to and appreciably spaced from the first plane, inking means mounted on the slide forwardly of the printing roller and between said second plane and the plane of the face of the type to apply ink to the face of the type prior to the printing portion of each cycle of the ticketer, means to reciprocate the slide to carry the inking means and the printing roller from at least one end of the type to the other, and means to retract the printing roller from the type on the rearward stroke of the slide and to advance the printing roller toward the type to thrust the tape into forcible contact with the type on the forward stroke of the slide.

9. A ticketer as set forth in claim 8, in which the inking means is a transfer roller, and there is an ink reservoir mounted on a fixed part of the ticketer forwardly of the slide so as to coat the transfer roller with ink when the slide is adjacent the terminus of its forward stroke.

10. In a ticketer, a relatively fixed chase of type, spaced rear and forward guide means beyond the respective ends of the type for extending a tape into a run overlying and generally parallel to the face of the type, a slide reciprocable in a plane parallel to the face of the type in the direction of the length of said run of the tape, intermittently operated means for pulling of the tape past the type during each rearward stroke of the slide, a printing roller confronting the type mounted on the slide, the tape passing between the type and the printing roller, partially around the printing roller and thence to the forward guide means, means to reciprocate the slide to carry the printing roller from at least one end of the type to the other, means to retract the printing roller from the type on the rearward stroke of the slide and to advance the printing roller toward the type to thrust the tape into forcible contact with the type on the forward stroke of the slide, and intermittently operated means responsive to travel of the slide to retard forward travel of the tape past the rear guide means during forward strokes of the slide.

11. A ticketer as set forth in claim 10, in which the tape retarding means comprises a tape gripping member movable into and out of engagement with the tape adjacent the rear guide means, and means on the slide cooperating with the gripping member to cause it to engage the tape during the latter part of the rearward stroke and the first part of the forward stroke of the slide.

References Cited in the file of this patent

UNITED STATES PATENTS

| | | |
|---|---|---|
| 714,297 | Ohmer et al. | Nov. 25, 1902 |
| 738,752 | Babcock | Sept. 15, 1903 |
| 939,297 | North | Nov. 9, 1909 |
| 1,062,283 | Kohnle | May 20, 1913 |

(Other references on following page)

UNITED STATES PATENTS

| Number | Name | Date |
|---|---|---|
| 1,197,036 | Kohnle | Sept. 5, 1916 |
| 1,320,927 | Runner | Nov. 4, 1919 |
| 1,413,631 | Tanner | Apr. 25, 1922 |
| 1,531,031 | Schweiger | Mar. 24, 1925 |
| 1,799,533 | Remsnider | Apr. 7, 1931 |
| 1,812,980 | Penney | July 7, 1931 |
| 1,904,764 | Banker | Apr. 18, 1933 |
| 1,931,369 | Arnold | Oct. 17, 1933 |
| 1,972,850 | McCarthy | Sept. 4, 1934 |
| 1,987,426 | Warren | Jan. 8, 1935 |
| 2,051,491 | Lockett et al. | Aug. 18, 1936 |
| 2,054,313 | Bright | Sept. 15, 1936 |
| 2,071,076 | La Borde et al. | Feb. 16, 1937 |
| 2,104,647 | Henry | Jan. 4, 1938 |
| 2,174,585 | Kotzich | Oct. 3, 1939 |
| 2,241,658 | Engberg | May 13, 1941 |
| 2,282,655 | Huck | May 12, 1942 |
| 2,299,396 | Keen et al. | Oct. 20, 1942 |
| 2,328,022 | Krueger | Aug. 31, 1943 |
| 2,390,792 | Jespersen | Dec. 11, 1945 |
| 2,443,764 | Ekberg | June 22, 1948 |
| 2,506,262 | Arvidson et al. | May 2, 1950 |
| 2,530,335 | Krueger et al. | Nov. 14, 1950 |